United States Patent [19]

Williamson

[11] Patent Number: 5,202,186

[45] Date of Patent: Apr. 13, 1993

[54] THERMAL PROTECTION SLEEVE FOR REDUCING OVERHEATING OF WIRE BUNDLES UTILIZED IN AIRCRAFT APPLICATIONS

[75] Inventor: Mickey A. Williamson, Everett, Wash.

[73] Assignee: The Boeing Company, Seattle, Wash.

[21] Appl. No.: 742,100

[22] Filed: Aug. 5, 1991

Related U.S. Application Data

[63] Continuation of Ser. No. 355,619, May 23, 1989, abandoned.

[51] Int. Cl.⁵ .............................................. D02G 3/00
[52] U.S. Cl. ................................ 428/375; 428/36.5; 428/36.1; 428/36.91; 428/36.9; 428/319.3; 428/373; 174/110 S; 174/110 F; 174/120 SR
[58] Field of Search ............... 428/40, 373, 352, 379, 428/365, 308.4, 319.3, 36.5, 36.1, 36.9, 36.91, 375; 174/110 S, 110 F, 120 SR, 120 G

[56] References Cited

U.S. PATENT DOCUMENTS

| | | | |
|---|---|---|---|
| 2,951,277 | 9/1960 | Youngs | 174/110 S |
| 3,576,388 | 4/1971 | Bruns | 174/110 F X |
| 3,588,318 | 6/1971 | Ollis | 174/110 S X |
| 3,659,458 | 7/1972 | Sorell et al. | 428/352 |
| 4,061,820 | 12/1977 | Magid et al. | 428/308.4 |
| 4,096,007 | 6/1978 | Braunling et al. | 428/40 |
| 4,230,753 | 10/1980 | Sheyon | 428/40 |
| 4,704,335 | 11/1987 | Landry | 428/391 |
| 4,775,566 | 10/1988 | Landry | 428/391 |
| 4,822,659 | 4/1989 | Anderson et al. | 428/319.3 X |

FOREIGN PATENT DOCUMENTS 61-173937  5/1986  Japan .................................. 428/319.3

Primary Examiner—Patrick J. Ryan
Assistant Examiner—N. Edwards
Attorney, Agent, or Firm—Conrad O. Gardner; B. A. Donahue

[57] ABSTRACT

An electrical cable having a wire bundle core surrounded by a thermal protection sleeve, the thermal protection sleeve consisting of a sandwich structure of a laminate of silicone foam provided on both sides with an acrylic adhered layer of fiber glass, the sandwich structure having an additional outer layer of acrylic adhesive adhered silicone release liner material or fiber glass lacing tape.

1 Claim, 1 Drawing Sheet

THERMAL PROTECTION SLEEVE FOR REDUCING OVERHEATING OF WIRE BUNDLES UTILIZED IN AIRCRAFT APPLICATIONS

This is a continuation of copending application Ser. No. 07/355,619 filed on May 23, 1989, which is now adandoned.

FIELD OF THE INVENTION

The present invention relates to protection of wire bundles utilized in aircraft applications, and more particularly, to thermal and chafe guard protection for wire bundles.

BACKGROUND OF THE INVENTION

The operation of an integrity of insulated conductors forming a core or wire bundle in an aircraft environment must be maintained otherwise a resulting transmission of erroneous data through the wire bundles may occur.

In a severe environment of increased temperatures such as inside the leading edge of a wing, a thermal barrier installed over the wire bundles can afford the protection needed.

SUMMARY OF THE INVENTION

Thermal protection for conductors is well known and exemplified for example in U.S. Pat. Nos. 2,641,561; 3,516,951; 3,772,239; 3,874,980; 4,388,366; and 4,686,141.

It is accordingly an object of the present invention to provide a flexible, thermal shape setting, thermal and chafe guard protection sleeve which includes a sandwich structure having a silicone foam core.

It is a further object of the present invention to provide a thermal protection sleeve for wire bundles which includes a silicone foam core with outer acrylic adhesive layers having a setup temperature which provides whatever shape the sleeve must take after installation over the wire bundles thereby eliminating the need for any mechanical fasteners resulting in reduced weight and installation costs.

BRIEF DESCRIPTION OF THE DRAWINGS

The invention will be better understood by the following description and reference to the accompanying drawing wherein.

DESCRIPTION OF THE PREFERRED EMBODIMENT

Figure 1:
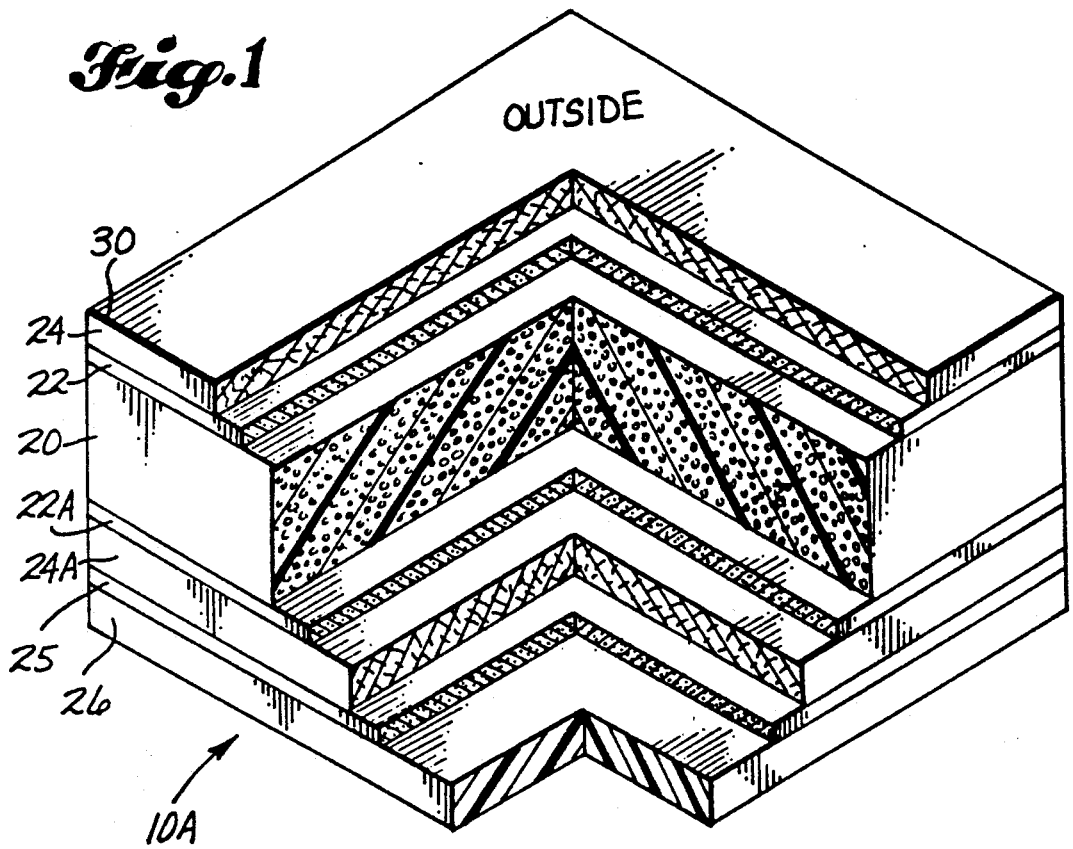
FIG. 1 is a cross-sectional view taken in perspective of the present insulative sleeve; and, FIG. 2 is a cross section of the wire bundle and sleeve from which the section of FIG. 1 was taken.
Figure 2:
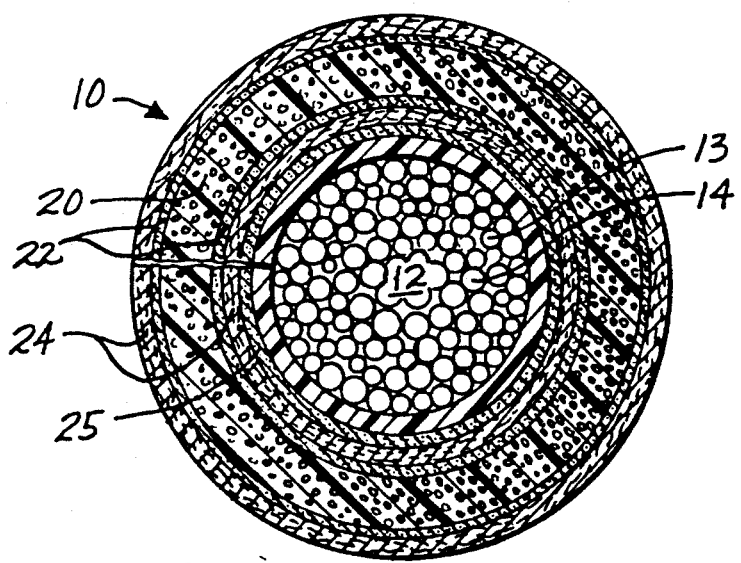

Turning now to FIGS. 1 and 2, it can be seen that a thermal protection sleeve 10 surrounds a wire bundle core 12 (see FIG. 2), which wire bundle core 12 is made up of a plurality of insulated conductors e.g. 13, 14. Turning now to FIG. 1, it should be noted that the thermal protection sleeve 10 comprises a sandwich structure having a laminate of silicone foam 20 provided on both sides with an acrylic adhesive adhered layer of fiber glass 24. Acrylic adhesive 22 for attaching fiber glass layers 24 to silicone foam laminate 20 may comprise e.g. Polyad 130 which is an acrylic adhesive manufactured by H & N Chemicals of Totowa, N.J. 07512.

Fiber glass layers 24 may comprise type CHR 1606 fiber glass made by CHR Industries, Inc. of New Haven, Conn. 06509.

An outer layer 25 of acrylic adhesive to set thermal protection sleeve 10 about core 12 of the wire bundle core including insulated electrical conductors 13 and 14. Acrylic adhesive layer 25 may comprise the same material as acrylic adhesive layers 22 while silicone release liner 26 protects the adhesive coating prior to application. A fiber glass lacing tape such as type 190L0F21R Tefglas may be utilized to retain thermal protection sleeve 10 about core 12 comprising type 190LOF21R Tefglas manufactured by Western Filament Company of Glendale, Calif. 91204. When the lacing tape is applied around the outer sleeve 10 to attach the thermal barrier to the wire core 12; 22A, 24A, 25, 26 and 10A materials as shown in FIG. 1 are not required. The Polyad 130 acrylic adhesive sets up at about 400° F. into whatever shape the sandwich structure takes after insulation over wire bundle core 12, or to adjacent attachment to heat emitting structures.

When desired the present sandwich structure comprising thermal protection sleeve 10 may be made fuel resistant by applying a fluorosilicone coating 30 on the outside surface of outer layer 24, 26, such fuel resistant coating may comprise 3M Scotch Weld Fuel Tank Coating type P/N EC-2600 made by Adhesives Coatings and Sealers Division/3M, 3M Center, St. Paul, Minn. 55101, a division of 3M.

What is claimed is:

1. An electrical cable having a wire bundle core surrounded by a thermal and chafe guard protection sleeve, said thermal and chafe guard protection sleeve comprising a sandwich structure;
    said sandwich structure including a laminate of silicone foam sandwiched between acrylic adhered layers of fiber glass;
    said thermal and chafe guard sleeve surrounded by a fluorosilicone coating on the outer layer.

* * * * *